Patented Jan. 26, 1932

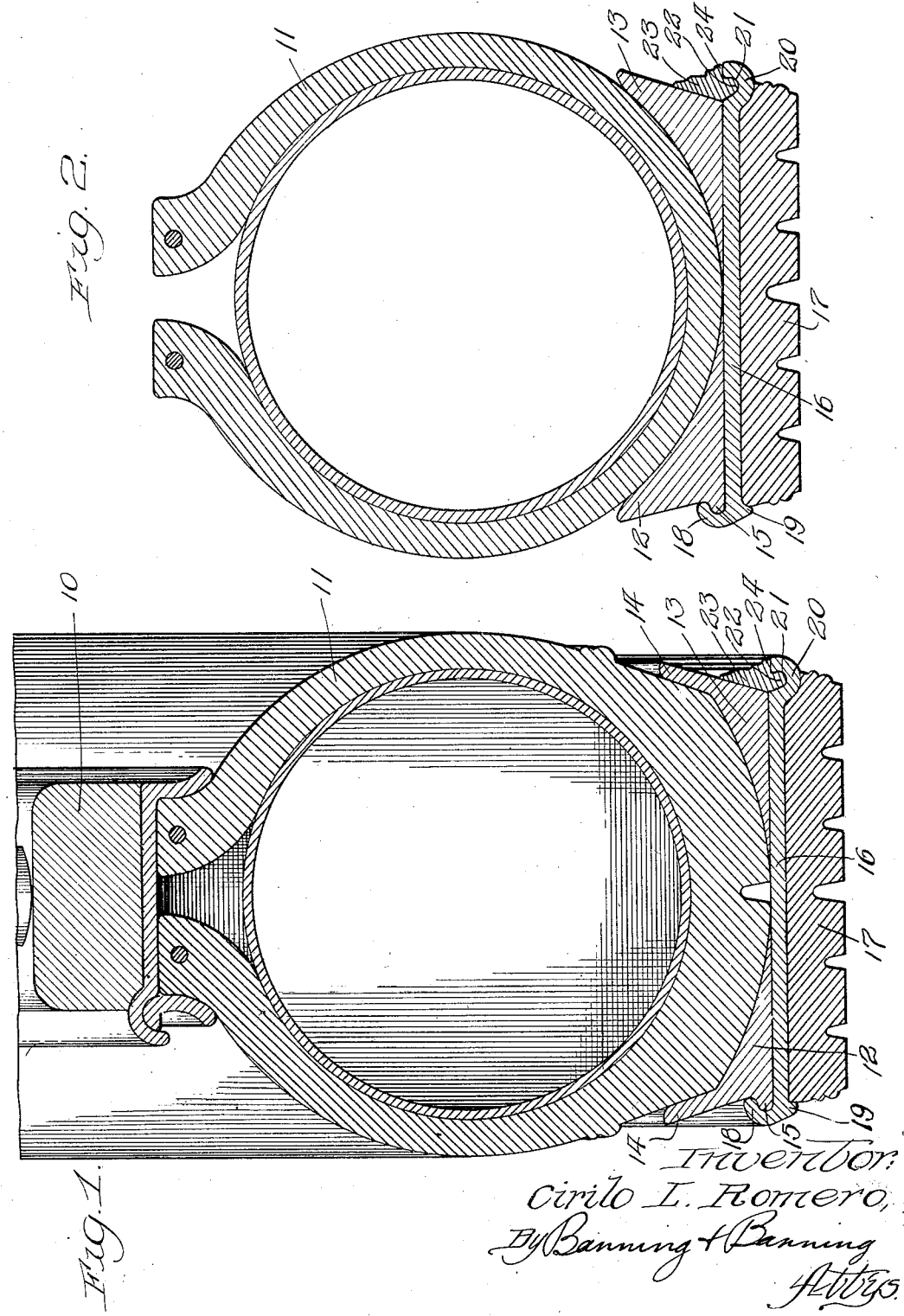

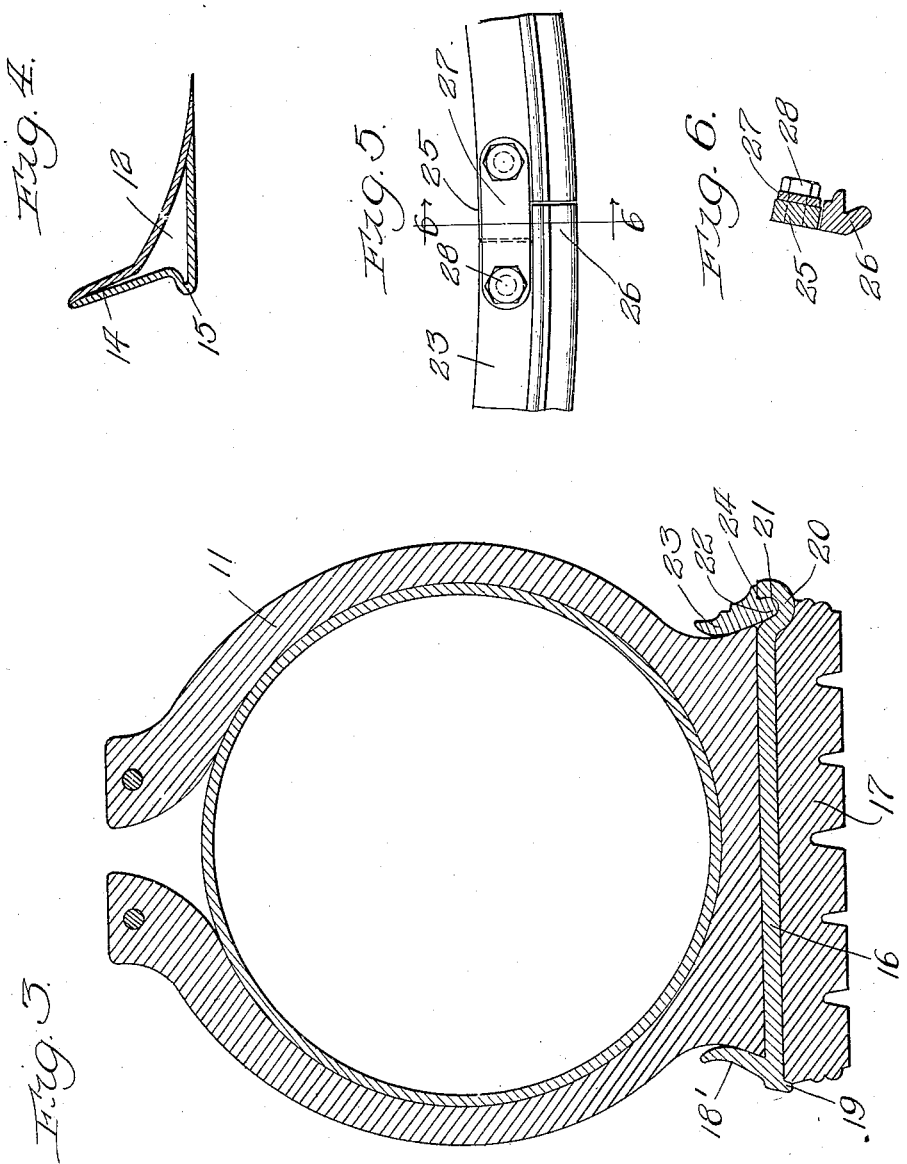

1,842,918

UNITED STATES PATENT OFFICE

CIRILO L. ROMERO, OF NEW YORK, N. Y.

VEHICLE WHEEL

Application filed February 15, 1930. Serial No. 428,576.

This invention relates to vehicle wheels and particularly to such wheels which are provided with armored pneumatic tires.

One of the objects of the invention is to provide armor which can be readily applied to, and removed from a tire.

A further object of the invention is to provide armor which can be readily applied to a tire from one side thereof and effectively secured to said tire at the other side of same.

A further object of the invention is to provide armor which can be readily mounted on a pneumatic tire to provide a unitary armored tread therefor.

Other objects, advantages and capabilities will later more fully appear.

My invention further resides in the combination, construction and arrangements of parts illustrated in the accompanying drawings, and while I have shown herein preferred embodiments, I wish the same to be understood as illustrative only and not limiting the scope of my invention.

In the drawings:

Figure 1 is a sectional view through a pneumatic tire provided with armor according to my invention, Fig. 2 is a similar view of a modified form of tire.

Fig. 3 is a similar view of a further modified form of tire,

Fig. 4 is a sectional detail of a modified form of ring which may be employed,

Fig. 5 is an elevational detail of the split ring connection, and

Fig. 6 is a sectional view on the line 6—6 of Fig. 5.

Referring to Fig. 1, the reference numeral 10 designates the felly of a wheel on which is mounted, in known manner, a pneumatic tire 11 of conventional type. To each side of the tread of said tire are applied metal rings 12 and 13, the outer surfaces of which are cylindrical in shape. The inner surface of the rings 12 and 13 is shaped to conform substantially to the shape of one side of the tread, which, in the form of tire shown in Fig. 1 gives said rings a substantially wedge-shaped section. The internal diameter of said rings is preferably somewhat smaller than the diameter of the corresponding tread when the tire is fully inflated, for the purpose hereinafter described. As shown in this figure the rings 12 and 13 extend inwardly of the tread to a point near the center thereof. At their outer sides, the rings 12 and 13 are provided with radially extending flanges 14 which are formed to engage the sides of the tire, the inner edges thereof being preferably curved to prevent chafing of said tire. Adjacent its outer cylindrical surface, the outer side of the ring 12 is provided with a laterally projecting curved bead 15.

Around the rings 12 and 13 is located a metal band or rim 16 which is of substantially cylindrical shape, the inner surface of which contacts with the outer cylindrical surfaces of said rings. On its outer surface the band 16 is provided with a resilient tread 17, which may suitably be of rubber, vulcanized in position or otherwise suitably secured to said band. Along one edge of the band 16 is provided with an inwardly directed flange 18, suitably formed to engage the bead 15 of the ring 12. Said edge of the band 16 is also provided with an outwardly directed bead 19 which serves to prevent the tread 17 from working off the band at that edge.

Along its other edge, the band 16 is deformed to provide a circumferential bead 20 which serves to prevent the tread 17 from working off the band at that edge. Said deformation also provides a circumferential groove 21 on the inner surface of the band 16 which is adapted to receive the bead 22 of a split ring 23.

The split ring 23 is formed to bear against the ring 13 and retain same in applied position. The split ring 23 is provided with a flange 24 which seats upon the band 16 beyond the groove 21. As shown in Fig. 5 the free ends of the split ring 23 are stepped to provide projections 25 and 26 which are adapted to overlap when in applied position and provide an abutting joint which prevents displacement of said ring by road shocks or the like. In order to provide positive means for connecting the ends of the split ring 23, it is preferred to provide a link 27 which is connected to both ends. One end of said link may be pivotally mounted upon one end of said ring 23 and the other end thereof may be removably connected to the other end of the ring 23, for example by means of a stud bolt 28.

As shown in Fig. 1 the rings 12 and 13 may be made of solid metal. If desired, these rings may be formed from strips of sheet metal suitably formed and united by welding or in other suitable manner, as shown in Fig. 4.

In assembling the armored tread upon the tire the latter is deflated so as to reduce its normal size to some extent. The ring 12 is then placed in position and the band 16 is forced over the same and over the tread of the tire until the bead 15 rests in the groove in the flange 18. The ring 13 is then forced into position between the tire 11 and the band 16 and the split ring 23 is applied in known manner and the link 27 secured in position by the bolt 28. During and after this operation the tire and band 16 may be subjected to hammering or other vibration to cause the parts to assume their appropriate positions. Finally the tire is inflated to its normal pressure which causes the tread thereof to exert pressure upon the rings 12 and 13 and thereby hold same strongly against the rim 16 so that slipping of the band 16 upon the tire 11 is effectively prevented.

Since the tread of the pneumatic tire 11 is protected from excessive wear, cuts and the like, it is unnecessary to provide tires to which my invention is to be applied with a substantial tread of the type shown in Fig. 1. Thus as shown in Fig. 2 the tread portion of the tire 11 may be of the same thickness as the side walls. The resiliency and riding qualities of the tire are thereby substantially improved.

In the modification shown in Fig. 3, the tire 11 has a tread which provides a substantially cylindrical outer surface which is adapted to engage directly with the inner cylindrical surface of the band 16 so that the rings 12 and 13 may be omitted. In this modification the band 16 is provided with a flange 18' which engages one side of the tread of the tire 11. The other side of the tread is engaged directly by the split ring 23.

I claim:

1. In a vehicle wheel, the combination of a pneumatic tire, a pair of rings adapted to be seated on the tread thereof and to cover a substantial portion of the tread, a metal band adapted to surround said rings, a flange on one edge of said band engaging the outer side of one of said rings and a split ring mounted on the other edge of said band engaging the outer side of the other ring.

2. In a vehicle wheel, the combination of a pneumatic tire, a pair of rings adapted to be seated on the tread thereof, a metal band adapted to surround said rings and to be slid over one of said rings and the tread of the tire, a flange on one edge of said band engaging the outer side of said ring and a split ring mounted on the other edge of said band engaging the outer side of the other ring.

3. In a vehicle wheel the combination of a pneumatic tire, a pair of rings adapted to be mounted on the tread thereof and to cover a substantial portion of the tread and provided with portions adapted to engage opposite sides of said tire, a laterally projecting bead on one of said rings, a metal band adapted to surround said rings and to be slid over one of said rings and over the tread of the tire, a flange on one edge of said band adapted to engage said bead, a seat on the other edge of said band adapted to receive a locking ring, said ring being adapted to engage the other said ring.

4. In a vehicle wheel, the combination of a pneumatic tire, a pair of rings adapted to be mounted on the tread thereof and provided with portions adapted to engage opposite sides of said tire and with portions adapted to engage a substantial portion of the tread of the tire, a laterally projecting bead on one of said rings, a metal band adapted to surround said rings and to be slid over one of said rings and over the tread of the tire, a resilient tread mounted on said band, a flange on one edge of said band adapted to engage said bead, a seat on the other edge of said band adapted to receive a locking ring, said ring being adapted to engage the other said ring.

In testimony whereof, I have hereunto set my hand and affixed my seal this 8 day of February, 1930.

CIRILO L. ROMERO.